Figure 1:
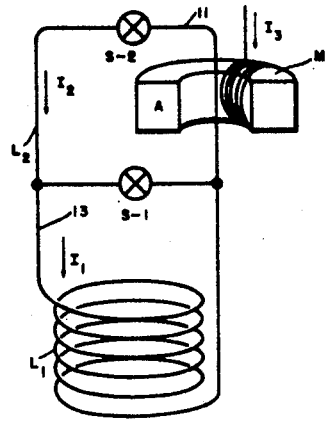

Sept. 22, 1964            H. L. LAQUER            3,150,291
INCREMENTAL ELECTRICAL METHOD AND APPARATUS FOR ENERGIZING
HIGH CURRENT SUPERCONDUCTING ELECTROMAGNETS
Filed Oct. 2, 1962

INVENTOR.
Henry L. Laquer
BY

United States Patent Office 3,150,291
Patented Sept. 22, 1964

3,150,291
INCREMENTAL ELECTRICAL METHOD AND APPARATUS FOR ENERGIZING HIGH CURRENT SUPERCONDUCTING ELECTROMAGNETS
Henry L. Laquer, Espanola, N. Mex., assignor to the United States of America as represented by the United States Atomic Energy Commission
Filed Oct. 2, 1962, Ser. No. 227,966
2 Claims. (Cl. 317—123)

This invention relates generally to a method and apparatus for energizing superconducting magnet coils. More specifically, it is directed to an incremental method for energizing such coils by repetitive electrical energy injection.

Hitherto, superconducting conductors were of small cross section, such as for example, $5 \times 10^{-4}$ cm.$^2$. A coil of 10 cm. average diameter, fabricated of such fine wire might have, for example, for a desired flux, 13,000 turns which require about four kilometers of the conductor. The advent of high field superconducting materials, such as niobium-tin, which seem to exhibit volume rather than surface conduction, i.e., critical current densities proportional to cross-sectional area rather than circumference, permits the construction of superconducting coils of heavier wire. For example, it is now feasible to utilize heavy wire or ribbon of $5 \times 10^{-2}$ cm.$^2$ and reducing the required length of wire to a few tens of meters. That is, a 10 cm. diameter coil will have about 130 turns which only require about 40 meters of conductor. It is apparent, that for a given total magnetic flux to be produced, the ampere turns are approximately the same whether the wire is fine or thick. Consequently, the use of the heavy conductor requiring only about 130 turns requires a current 100 times higher in magnitude than a 13,000-turn coil, other things being equal. For example, a required magnetic flux which can be obtained in the 13,000-turn coils with current magnitudes in the tens of amperes requires thousands of amperes in a 130-turn coil.

The energy of the desired magnetic field has to be transferred from some source generally at room temperature into the superconducting coil in the cryostat. The introduction of currents much greater than 200 amperes into the cryostat coolant presents formidable engineering problems. The conductor of sufficiently low resistance of ordinary conductivity is a serious heat transmitter if introduced into the coolant.

It follows from the foregoing that a method of energizing a large conductor, few-turn superconducting coil by incremental stages from a low current source has a number of great advantages.

It is, accordingly, one objective of the present invention to enable the use of heavy wire or ribbon in a superconducting magnet coil even though the reduced number of turns of such heavy wire or ribbon requires, for a given magnetic flux, an energizing current of thousands of amperes.

It is another objective of the present invention to energize a superconducting magnet coil cumulatively by repetitive injections of energy capable of being transferred by low current capacity conductors.

Another objective of the present invention is to provide a combination of switches, an auxiliary energy sharing superconducting coil and a main superconducting magnet coil, all of which remains immersed in the coolant bath.

Figure 2:
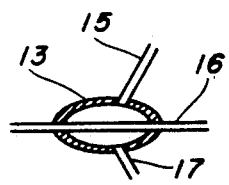
Figure 3:
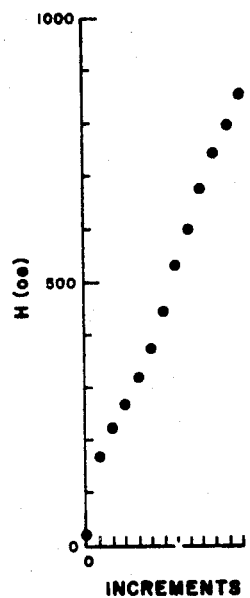
Figure 4:
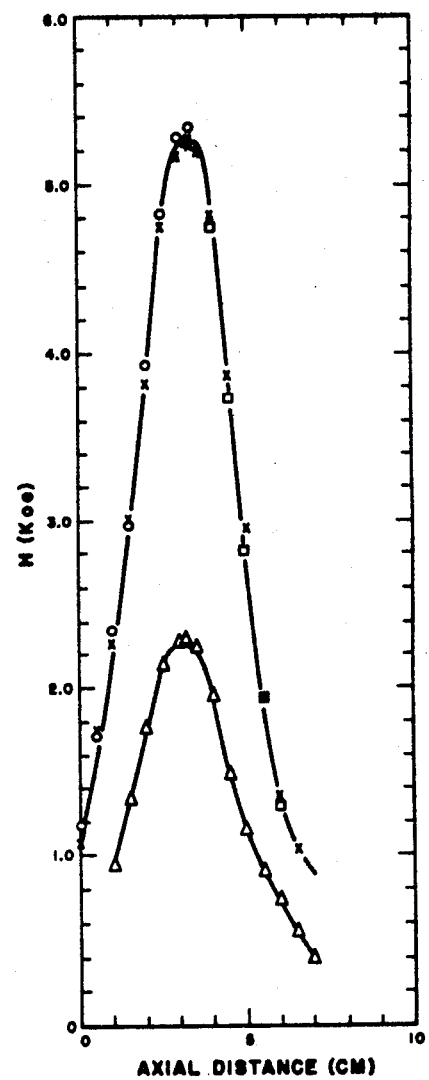

The manner of accomplishment of these objectives and the presence of other advantages of the present invention will become apparent as this description proceeds with reference to the drawing in which FIGURE 1 is a schematic circuit diagram, and
FIGURE 2 is a cross-sectional view of a thermally-controlled switch.
FIGURE 3 is a graph of a sequence of energizing steps, and
FIGURE 4 is the magnetic field intensity along the axis of one experimental superconducting magnet.

The basic principle underlying the operation of the present invention may be termed "flux-pumping" and consists essentially of repetitively injecting magnetic flux into an auxiliary superconducting coil or loop from an external source and by appropriate switching techniques transferring a portion of the flux from the auxiliary coil into the main coil. By these techniques, a magnetic flux of 5.42 kilo-oersteds has been accumulated in a 21-turn coil of 0.25 cm. diameter Nb$_3$Sn wire.

Referring to FIGURE 1 of the drawing, the apparatus is seen to comprise a main coil $L_1$, an auxiliary loop $L_2$, two switches S–1 and S–2 and a flux-inducing toroidal electromagnet M.

Switches S–1 and S–2 can be of any type known in the superconducting art such as magnetically biased superconducting-to-normal switches or thermal switches. The switch shown in FIGURE 2 and in application Serial No. 26,325, filed concurrently with this application, is particularly adapted to the purpose.

Many different forms and shaps of thermally-operated switches are feasible. Tests have shown that all the successful ones have used a 2 to 10 cm. long region of the superconducting circuit housed in a non-superconducting metal shell which is submerged below the level of the liquid helium and is in controllable communication with the liquid. Switching action is initiated by heating the region either electrically or by blowing warm helium gas over it. Depending on power input, flow rate and current, the switching action can be triggered in less than a second, and the switch will return to the superconducting state in 5 to 10 seconds.

One embodiment of this type switch is shown in FIGURE 2. The superconducting wire 16 passes through a shell-like housing 13. A tube 15 is connected to a source of warm gas under pressure. The temperature of the gas must be above the critical temperature and as a matter of convenience, its temperature is that of the environment outside the cryostat. Tube 17 admits coolant when pressure is removed from within the shell.

The steps involved in the flux accumulation method of this invention are as follows with reference to FIGURE 1:

(1) Switch S–2 is opened and the N-turns of the primary winding of toroidal transformer M are energized by increasing a current $I_3$ from zero to a given value, thus establishing a magnetic flux A in the magnet core. Transformer M in the embodiment herein described has a toroidal iron core with a cross section of 2.0 x 3.8 cm. and a central hole of 3.2 cm. dia. Saturation induction is around 120,000 lines.

(2) Switch S–2 is permitted to close and $I_3$ is reduced to zero which creates a persistent current $I_2=A/L_2$ in the auxiliary loop. By proper choice of the number of primary turns $I_2=N\,I_3$ can be chosen over a range within the limits established by the inherent properties of the materials used.

(3) Switch S–1 is opened and the flux A redistributes itself between the main coil $L_1$ and the auxiliary loop $L_2$. The persistent or superconducting current redistributes so that $I_2'=I_1'$ and $$I_1'(L_1+L_2)=A \qquad (1)$$

(4) Switch S-1 is permitted to close and the flux trapped in the main coil is now $$\Phi_1' = L_1'L_1 = Ax \quad (2)$$

where $$x = L_1/(L_1+L_2) \quad (3)$$

(5) Flux A is re-established in the auxiliary loop as in (1) and (2).

(6) $\Phi_1'$ and A are shared between the two inductances as in (3) so that $$I_1''(L_1+L_2) = A + \Phi_1' = A(1+x) \quad (4)$$

(7) After closing S-1 as in (4)

$$\Phi_1'' = I_1''.L_1 = A(x+x^2) \quad (5)$$

(8) n-Fold repetition of the cycle leads to $$\Phi_1^{(n)} = A(x+x^2+ \ldots x^n) \quad (6)$$

or $$\Phi_1^{(n)} = A(x-x^{n+1})/(1-x) \quad (7)$$

In the limit for $n \to \infty$ $$\Phi_1^{(\infty)} = Ax/(1-x) = AL_1/L_2 = L_1I_2 \quad (8)$$

This means that the limiting current $I_1^{(\infty)}$ in the main coil is just equal to the current induced in the auxiliary coil in each cycle.

Since in actual practice an iron core toroid is used which exhibits some remanence so that it is best to reverse $I_3$ in step (2) rather than just reduce it to zero. Also the flux A available for sharing in step (3) is only that which is not held back by the remanence of the core.

RESULTS

Table I summarizes the results obtained with coils in boiling liquid helium (3.95° K. at the local atmospheric pressure of 580 torr). The table lists the coil dimensions, the number of turns, the conductor dimensions, the maximum field, $H_{max}$, in kilo-oersteds attained with each coil, the calculated galvanometer constants, $H/I$ in oersted/ampere, and the approximate inductances, L, in microhenries. The first two coils Nb I and Nb II were wound from cold rolled niobium ribbon spaced and insulated by masking tape. FIG. 3 shows the stepwise increase of flux observed with the rather large diameter coil Nb II. Field strengths and profiles were measured by a calibrated bismuth magneto-resistance probe. It is evident that the process can be reversed so as to reduce the flux and that the magnitude of each step can be adjusted by varying $I_3$ and hence the flux increment A. Currents of magnitude up to about 200 amperes can be induced in both coils Nb I and Nb II. Above this value critical conditions may be exceeded and the field lost.

The third coil Nb-Sn III was made from a 2.5 mm. O.D. niobium tube containing an approximately 1.3 mm. dia. powder core of mixed niobium and tin. It was prepared according to the method of Kunzler et al., as described in the Physical Review Letters, volume 6, 1961, page 89, and insulated after heat treatment by anodizing. FIG. 4 gives field plots at two different levels of flux. The maximum field of 5.4 koe. achieved with this coil corresponds to a current of 1070 amperes and an energy of about 10 joules.

The electrical flux pumping method of the present invention is capable of establishing very large currents in superconducting coils using conductors of arbitrarily large cross section, with the only limits set by the material properties of the superconductors.

What is claimed is:

1. Apparatus for the incremental energizing of superconducting electromagnets comprising a cryostat containing a coolant, a superconductive electromagnet, a first selectively-controlled electrical switch connected in parallel with the superconductive electromagnet, an auxiliary superconducting coil serially including a second selectively controlled electrical switch, one end of the auxiliary superconducting coil being connected to one terminal of said first switch, the remaining end of the auxiliary superconducting coil being connected to the other terminal of the first switch, an energy injecting electromagnet supported in an inductive relationship with the auxiliary superconducting coil, said superconductive electromagnet, first switch, auxiliary superconducting coil including its second switch being immersed in coolant having a temperature below the critical temperature of the superconductors in the superconductive electromagnet and in the superconductive auxiliary coil, whereby when the first switch is closed and the second switch is open and said energy injecting electromagnet is energized, and both switches are closed when the injecting electromagnet is d-energized, an induced current circulates in said auxiliary coil, and the magnetic lines corresponding thereto are shared with the superconductive electromagnet when said first switch is opened, and said apparatus is prepared for repetitively injecting energy by closing said first switch and opening the second switch to permit energizing of said injecting electromagnet and then closing said second switch after the injecting electromagnet is energized in readiness for the next cycle.

2. The apparatus of claim 1 in which said switches are lengths of superconductive material enclosed in a metallic shell, a source of warm gas, a duct connecting the upper portion of said switch shell to said source of warm gas and an exhaust duct connected to a bottom portion of said switch shell, whereby admission of gas into said switch shell permits the superconductive material to rise above its critical temperature, thereby obtaining the resistance of normal conductivity and in a circuit of superconductive resistances being in effect an open circuit.

*Table I*

| Coil | I.D. (cm.) | O.D. (cm.) | Length (cm.) | Turns N | Conductor Dimensions (cm.) | $H_{max}$ (Koe) | H/I (oe/a) | L (μh) |
|---|---|---|---|---|---|---|---|---|
| Nb I | 3.8 | 4.2 | 12.4 | 56 | 0.87 x 0.046 | 1.37 | 5.4 | 33 |
| Nb II | 7.95 | 8.6 | 10.8 | 58 | 0.95 x 0.027 | 0.96 | 5.44 | 151 |
| Nb-Sn III | 4.1 | 5.1 | 2.5 | 21 | 0.25 dia. | 5.42 | 8.05 | 18 |

References Cited in the file of this patent

UNITED STATES PATENTS

| 2,913,881 | Garwin | Nov. 24, 1959 |
| 3,061,783 | Wilson | Oct. 30, 1962 |